(12) United States Patent
Sleet et al.

(10) Patent No.: US 10,987,768 B2
(45) Date of Patent: Apr. 27, 2021

(54) TORQUE TOOL WITH LATCH ASSEMBLY

(71) Applicant: FORUM US, INC., Houston, TX (US)

(72) Inventors: Peter Sleet, Collieston (GB); David Owen, Aberdeenshire (GB)

(73) Assignee: FORUM US, INC., Houston, TX (US)

( * ) Notice: Subject to any disclaimer, the term of this patent is extended or adjusted under 35 U.S.C. 154(b) by 279 days.

(21) Appl. No.: 16/172,360

(22) Filed: Oct. 26, 2018

(65) Prior Publication Data

US 2020/0130113 A1 Apr. 30, 2020

(51) Int. Cl.
*B23P 19/06* (2006.01)
*E21B 41/04* (2006.01)
*E21B 41/00* (2006.01)

(52) U.S. Cl.
CPC ........ *B23P 19/066* (2013.01); *E21B 41/0007* (2013.01); *E21B 41/04* (2013.01)

(58) Field of Classification Search
CPC ... B25B 23/147; B25B 23/1475; B25B 23/14; B25B 21/00; B25B 23/141; B25B 21/008; B25B 23/1415; B23P 19/066; B23P 19/06; E21B 41/0007; E21B 41/0014; E21B 41/04; E21B 41/06; E21B 43/013; E21B 41/0092; E21B 41/0099; E21B 33/035; E21B 41/00; B63C 11/52; F16L 37/04
See application file for complete search history.

(56) References Cited

U.S. PATENT DOCUMENTS

| 3,454,111 | A | | 7/1969 | Niess |
| 4,411,317 | A | * | 10/1983 | Gieswein ............ E21B 43/013 166/347 |
| 4,443,130 | A | | 4/1984 | Hall |
| 5,253,554 | A | * | 10/1993 | Riera .................. B25B 7/126 29/252 |
| 6,167,831 | B1 | | 1/2001 | Watt et al. |
| 6,223,675 | B1 | | 5/2001 | Watt et al. |
| 6,257,162 | B1 | | 7/2001 | Watt et al. |
| 6,390,012 | B1 | | 5/2002 | Watt et al. |

(Continued)

FOREIGN PATENT DOCUMENTS

| EP | 3107690 A2 | 12/2016 |
| GB | 2557200 A | 6/2018 |

(Continued)

OTHER PUBLICATIONS

International Searh Report and Written Opinion dated Jan. 21, 2020, corresponding to Application No. PCT/US2019/054413.

(Continued)

*Primary Examiner* — Robert J Scruggs (57) ABSTRACT

A torque tool to apply torque to a subsea component with a remotely operated vehicle (ROV) includes a housing, a socket drive to rotate within the housing, and a latch mechanism. The latch mechanism includes a latch to move with respect to the housing between an engaged position to engage the subsea component and a disengaged position to disengage the subsea component. The latch mechanism further includes a biasing mechanism to bias the latch from the engaged position towards the disengaged position, and/ or an electric motor to move the latch from the disengaged position towards the engaged position.

20 Claims, 6 Drawing Sheets

(56) References Cited

U.S. PATENT DOCUMENTS

| | | | |
|---|---|---|---|
| 6,805,382 B2 * | 10/2004 | Jennings | F16L 37/002 |
| | | | 166/341 |
| 6,928,947 B1 | 8/2005 | Clapham | |
| 10,107,059 B2 | 10/2018 | Thompson et al. | |
| 2012/0175123 A1 | 7/2012 | Roberts et al. | |
| 2013/0167691 A1 * | 7/2013 | Ullrich | B25B 23/0064 |
| | | | 81/57.11 |
| 2016/0346883 A1 * | 12/2016 | Walton | B23P 19/069 |
| 2017/0114612 A1 * | 4/2017 | Lewkoski | B25B 21/002 |

FOREIGN PATENT DOCUMENTS

| | | |
|---|---|---|
| JP | H10329051 A | 12/1998 |
| WO | 2004065068 A1 | 8/2004 |
| WO | 2015118335 A2 | 8/2015 |
| WO | 2017042152 A1 | 3/2017 |

OTHER PUBLICATIONS

International Invitation to Pay Fees dated Jan. 21, 2020, corresponding to Application No. PCT/US2019/054397.

* cited by examiner

TORQUE TOOL WITH LATCH ASSEMBLY

BACKGROUND

Field

Embodiments of the present disclosure relate to a torque tool that includes a latch assembly to latch to a subsea component when applying torque to the subsea component used in the oil and gas industry.

Description of the Related Art

Subsea torque tools are required to perform a range of tasks on subsea infrastructure and equipment, such as to apply torque to actuate rotating components of valves, or to lockdown or release clamps on equipment for the oil and gas industry. Typically, these rotating components are designed to be actuated at a specific torque, and when required to rotate a subsea component, an operator of a remotely operated vehicle (ROV) torque tool will choose the correct socket size and apply the appropriate torque so that the tool does not impart a torque greater than the maximum capability of the subsea component. The component may fail or become damaged if the torque applied thereto by a torque tool is excessive. The retrieval of the subsea component for repair or replacement can be difficult and expensive.

The range of tasks that an ROV torque tool is required to perform necessitates that the torque output of the tool must be changed depending on the torque requirements of the task. When applying torque, the torque tool latches to the subsea component with a latch mechanism separate from the socket mechanism to provide stability and prevent rotation between the torque tool and the subsea component. The latch mechanism, however, may be unreliable, having the tendency to lock up during operation or during loss of power. For example, a torque tool may not be able to disengage from a subsea component if power is lost during operation.

Therefore, there exists a need for a torque tool with a latch mechanism that is reliable and consistent, even during moments with losses of power.

SUMMARY

Embodiments disclosed herein relate to tools and methods for applying torque to subsea components utilized in the oil and gas industry.

In one embodiment, a torque tool to apply torque to a subsea component with a ROV is disclosed. The tool includes a tool housing, a socket drive to rotate within the tool housing, and a latch mechanism. The latch mechanism includes a latch to move with respect to the tool housing between an engaged position to engage the subsea component and a disengaged position to disengage the subsea component, and a biasing mechanism to bias the latch from the engaged position towards the disengaged position.

In another embodiment, a torque tool to apply torque to a subsea component with a ROV is disclosed. The tool includes a tool housing, a socket drive to rotate within the tool housing, and a latch mechanism. The latch mechanism includes a latch to move with respect to the tool housing between an engaged position to engage the subsea component and a disengaged position to disengage the subsea component, and an electric motor configured to move the latch from the disengaged position towards the engaged position.

In yet another embodiment, a method of applying torque to a subsea component is disclosed. The method includes receiving electric power at a torque tool, receiving a control signal at the torque tool, latching the torque tool to the subsea component using the electric power based upon the control signal, providing torque to the subsea component from the torque tool, and unlatching the torque tool from the subsea component.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to a torque tool for use subsea with an ROV to provide torque to a subsea component. The tool includes a tool housing and a socket drive that rotates within the tool housing. The socket drive is used to engage and provide torque to the subsea component. The tool further includes a latch mechanism to engage with and disengage from (e.g., latch with and unlatch from) the subsea component, such as to secure the tool to the subsea component when providing torque. The latch mechanism includes one or more latches that move with respect to the tool housing between an engaged position to engage the subsea component and a disengaged position to disengage the subsea component. The latches are used to hold the tool in place and prevent axial movement between the tool and the subsea component. An example subsea component may be a receptacle mounted on a subsea structure or a stab plate attached to a flying lead.

The latch mechanism may further include a biasing mechanism configured to bias the latch from the engaged position towards the disengaged position. Additionally or alternatively, the latch mechanism may include an electric motor to move the latch from the disengaged position towards the engaged position. In one embodiment, when power is not provided to the electric motor, the electric motor allows the latch to move from the engaged position towards the disengaged position without applying an electrical load against movement of the latch. The torque tool is able to receive electric power, such as from the ROV or from the surface, and provide the electric power to the electric motor. The torque tool is able to receive control signals, such as also from the ROV or from the surface, to control the electric motor.

Figure 1:
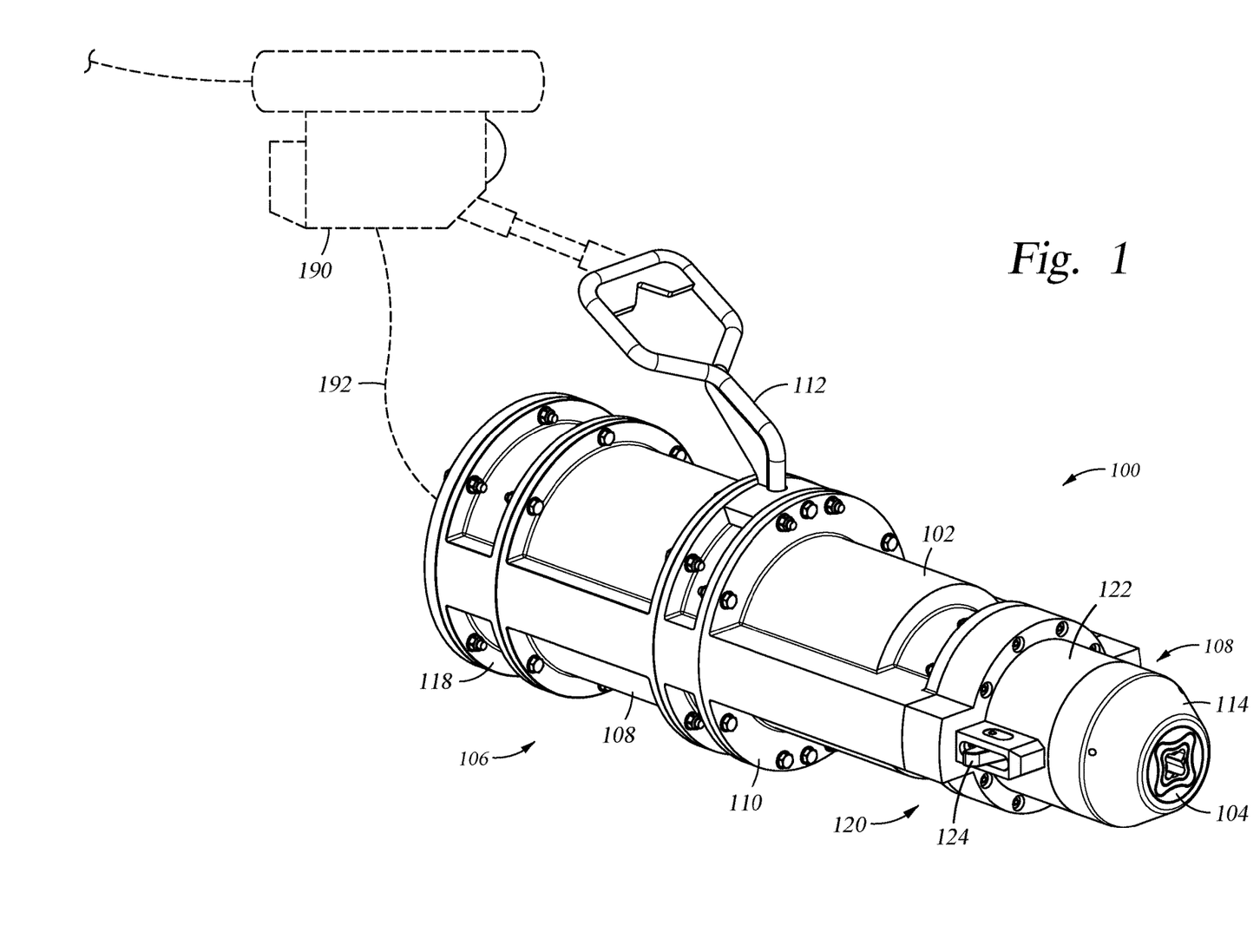
FIG. 1 is a perspective view of a torque tool in accordance with one or more embodiments of the present disclosure.
Figure 2:
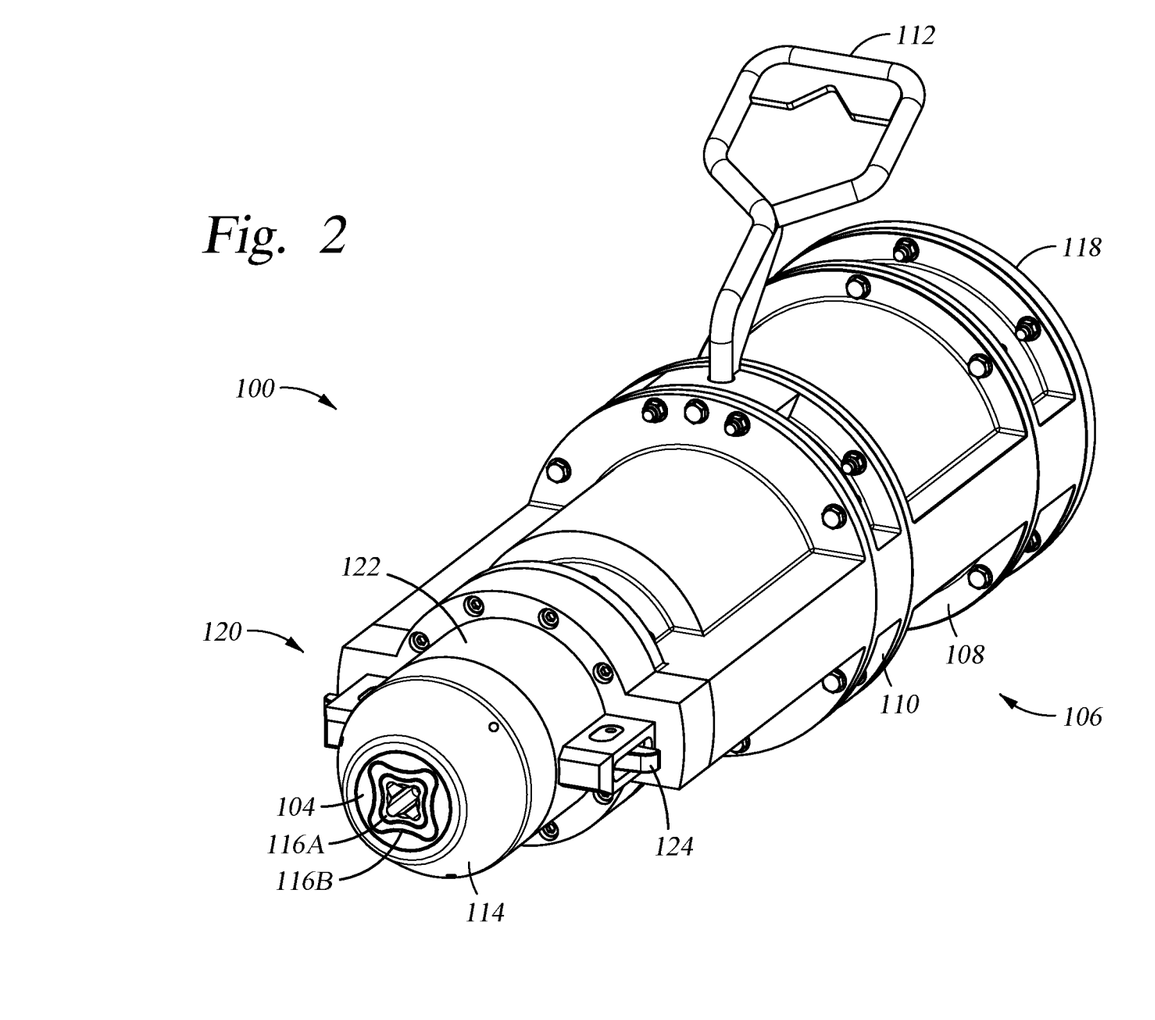
FIG. 2 is a perspective view of the torque tool in accordance with one or more embodiments of the present disclosure.
Figure 3:
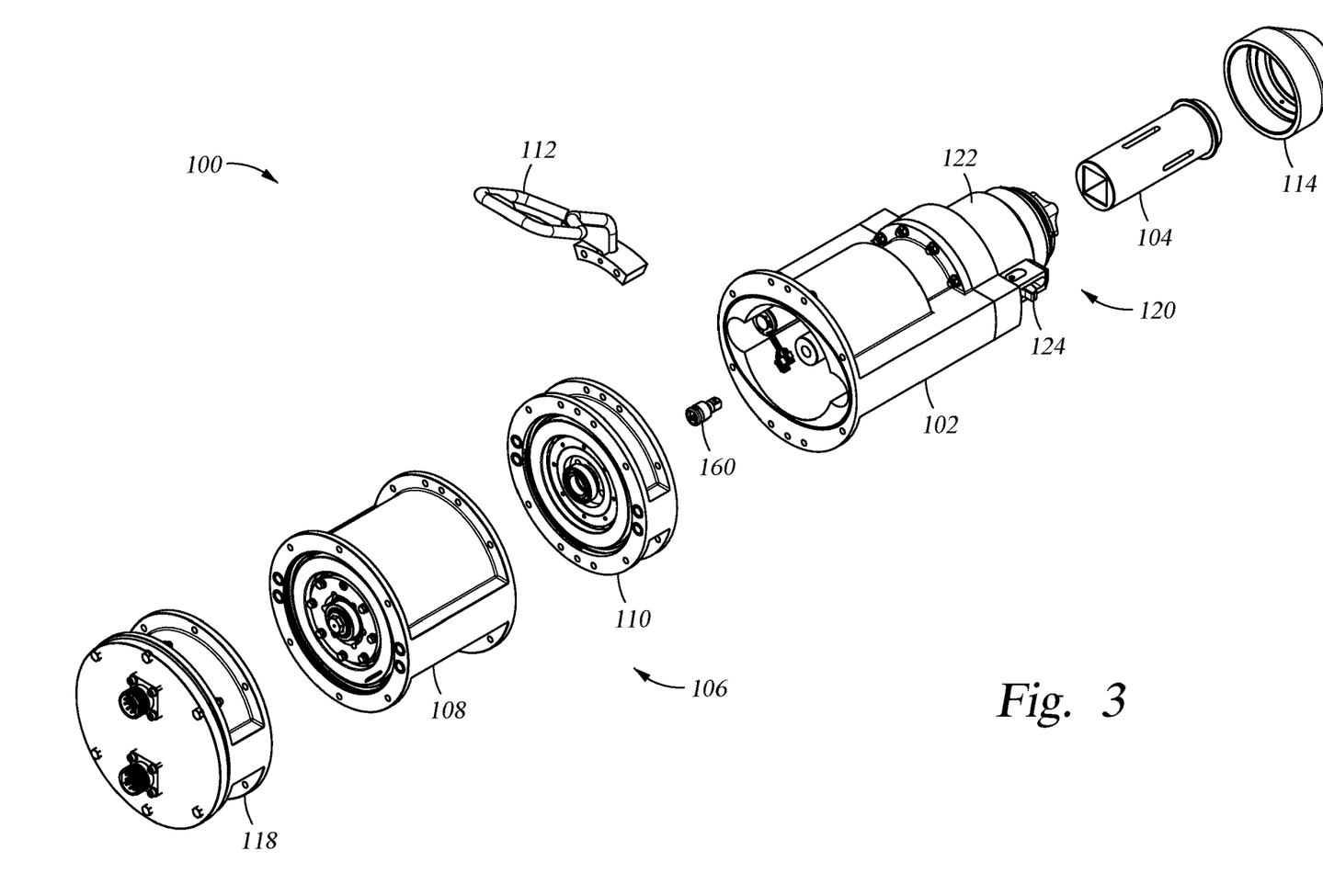
FIG. 3 is an exploded view of the torque tool in accordance with one or more embodiments of the present disclosure.

FIGS. 1-3 provide multiple views of a torque tool 100 in accordance with one or more embodiments of the present disclosure. In particular, FIGS. 1 and 2 are perspective views of the torque tool 100, and FIG. 3 is an exploded view of the torque tool 100. The tool 100 is for use subsea with an ROV 190 to latch to and provide torque to a subsea component. The tool 100 includes a housing 102 with a socket drive 104 positioned within and rotatable with respect to the housing 102. The tool 100 further includes a drive mechanism 106 to provide torque to the socket drive 104, such as for rotating the socket drive 104. The socket drive 104 is used to provide torque to the subsea component with the drive mechanism 106 generating and providing the torque used by the socket drive 104.

The drive mechanism 106 includes one or more motors to provide torque to the socket drive 104. For example, the drive mechanism 106 as shown includes a first motor 108 and a second motor 110, each capable of providing different torques or torque ranges to the socket drive 104, such as through a drive extension 160. In one or more embodiments, one or both of the first motor 108 and the second motor 110 may be an electric motor, such as an electric direct drive motor. Further, the housing 102 of the tool 100 is formed from one or more components (e.g., sub-housings) coupled with each other. For example, the first motor 108 and the second motor 110 each are shown as separate components with distinct housings from each other, though the motors 108 and 110 may share housings with the housing 102 of the tool 100. Further, a latch mechanism 120 discussed below includes a latch housing 122, though the latch housing 122 may be included within or referred to as part of the housing 102 of the tool 100. Thus, though the tool 100 is shown as having multiple components used to form the housing 102, discussed more below, the tool 100 is not so limited and may have more or less components used to form the tool 100 and/or the housing 102 without departing from the scope of the present disclosure.

The tool 100 includes a latch mechanism 120 with a latch housing 122 and one or more latches 124 movable between an engaged position and a disengaged position. In particular, the latch 124 is movable to an engaged position with respect to the latch housing 122 to engage a subsea component, and is movable to a disengaged position with respect to the latch housing 122 to disengage a subsea component. The engaged position of the latch 124 may also be referred to as the extended or latched position, and the disengaged position of the latch 124 may also be referred to as the retracted or unlatched position.

The latch mechanism 120 is used to engage and latch the tool 100 to the subsea component when providing torque to the subsea component through the socket drive 104. The latch mechanism 120 secures the tool 100 to the subsea component to prevent the tool 100 from axially moving with respect to the subsea component, therefore enabling the tool 100 to maintain engagement with the subsea component and provide torque through the socket drive 104. Discussed more below, the latch mechanism 120 includes a biasing mechanism to bias the latch 124 from the engaged position towards the disengaged position. Additionally or alternatively, the latch mechanism 120 includes an electric motor to move the latch 124 from the disengaged position towards the engaged position. In one embodiment, when power is not provided to the electric motor of the latch mechanism 120, the electric motor allows the latch 124 to move from the engaged position towards the disengaged position without applying an electrical load (e.g., force or resistance) against movement of the latch 124.

Referring still to FIGS. 1-3, the tool 100 includes a handle 112 coupled to the housing 102 for the ROV 190 to grip and move the tool 100 through the use of the handle 112. A nose cone 114 is included within the tool 100, such as coupled to the tool housing 102 and/or the latch housing 122, with the socket drive 104 rotatable with respect to the nose cone 114. The nose cone 114 may be used to help guide the tool 100, or the socket drive 104, into engagement with the subsea component. Further, the socket drive 104 may include one or more sockets 116A and 116B of different sizes to engage with different sized subsea components. The sockets 116A and 116B may be nested and movable with respect to each other, such as by having a smaller socket 116A positioned within and movable with respect to a larger socket 116B. For example, when engaging a subsea component with the larger socket 116B, the smaller socket 116A moves with respect to the larger socket 116B by retracting into the tool 100 to receive the subsea component into the larger socket 116B.

Further, the torque tool 100 includes an electronics section 118 to receive electric power for the tool 100. The electronics section 118 may receive electric power from the ROV 190, as shown, and/or from the surface, such as from a support structure (e.g., vessel or rig) located on or above a surface of the sea. The electric power may be provided to the electronics section 118 using a cable 192, umbilical, tether, or similar structure capable of transmitting electric power. The electric power is provided from the electronics section 118 to the electric motor(s) of the latch mechanism 120, as needed. Additionally or alternatively, the electronics section 118 may include a power source, such as a battery, to store and provide electric power. Further, in one or more embodiments, the electronics section 118 may include a power generator to generate electric power.

The electronics section 118 may additionally or alternatively be used to receive control signals for the tool 100. For example, the electronics section 118 may receive control signals for controlling electric motor(s) of the latch mechanism 120. In such an embodiment, the electronics section 118 may include a controller that receives the control signals from the ROV 190 and/or the surface. The control signals may be sent to the electronics section 118 using the same medium as the electric power (e.g., the cable 192), or the control signals may be separately sent to the electronics section 118, such as through a separate cable or wirelessly.

Figure 4:
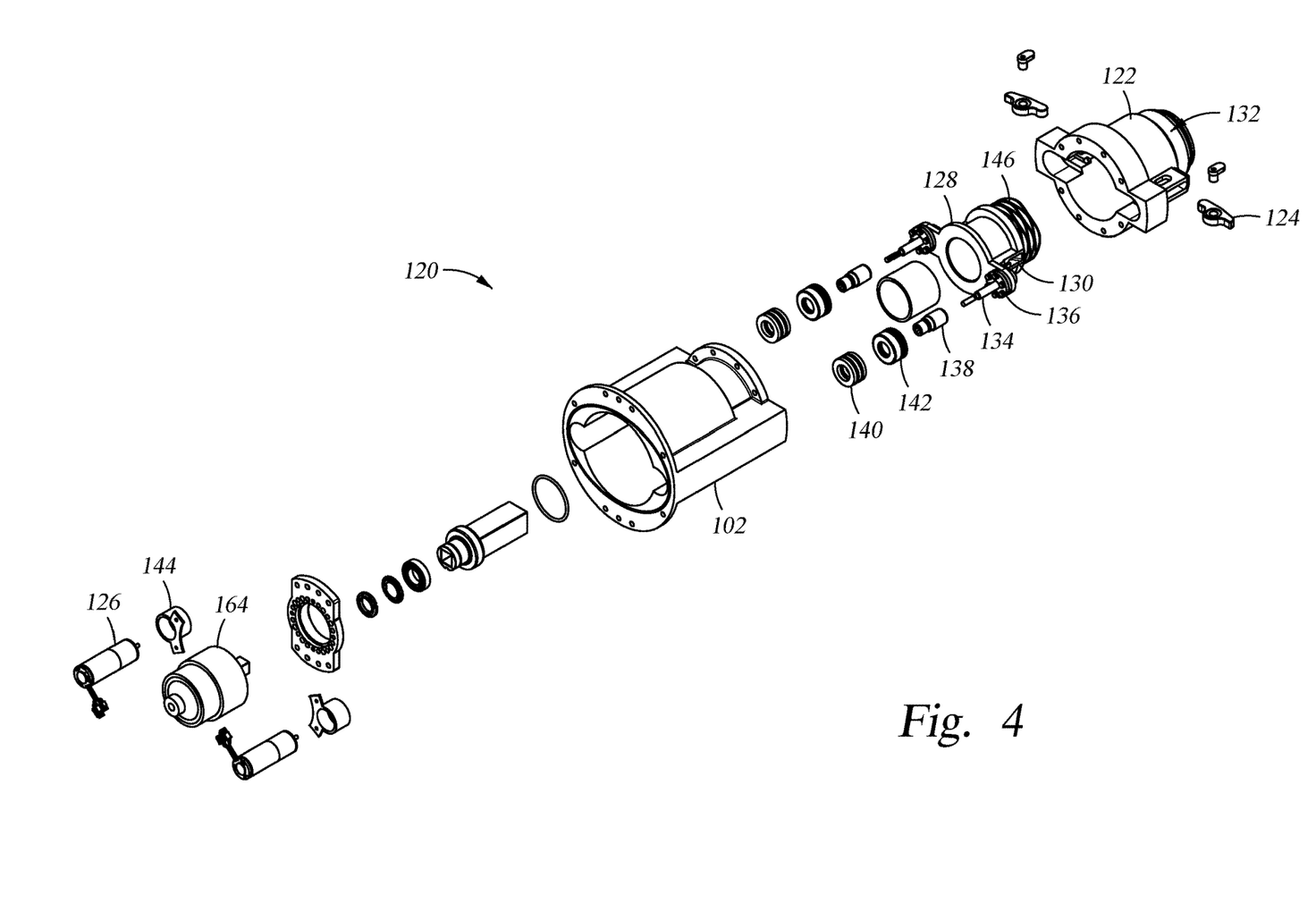
FIG. 4 is an exploded view of a latch mechanism of the torque tool in accordance with one or more embodiments of the present disclosure.
Figure 5:
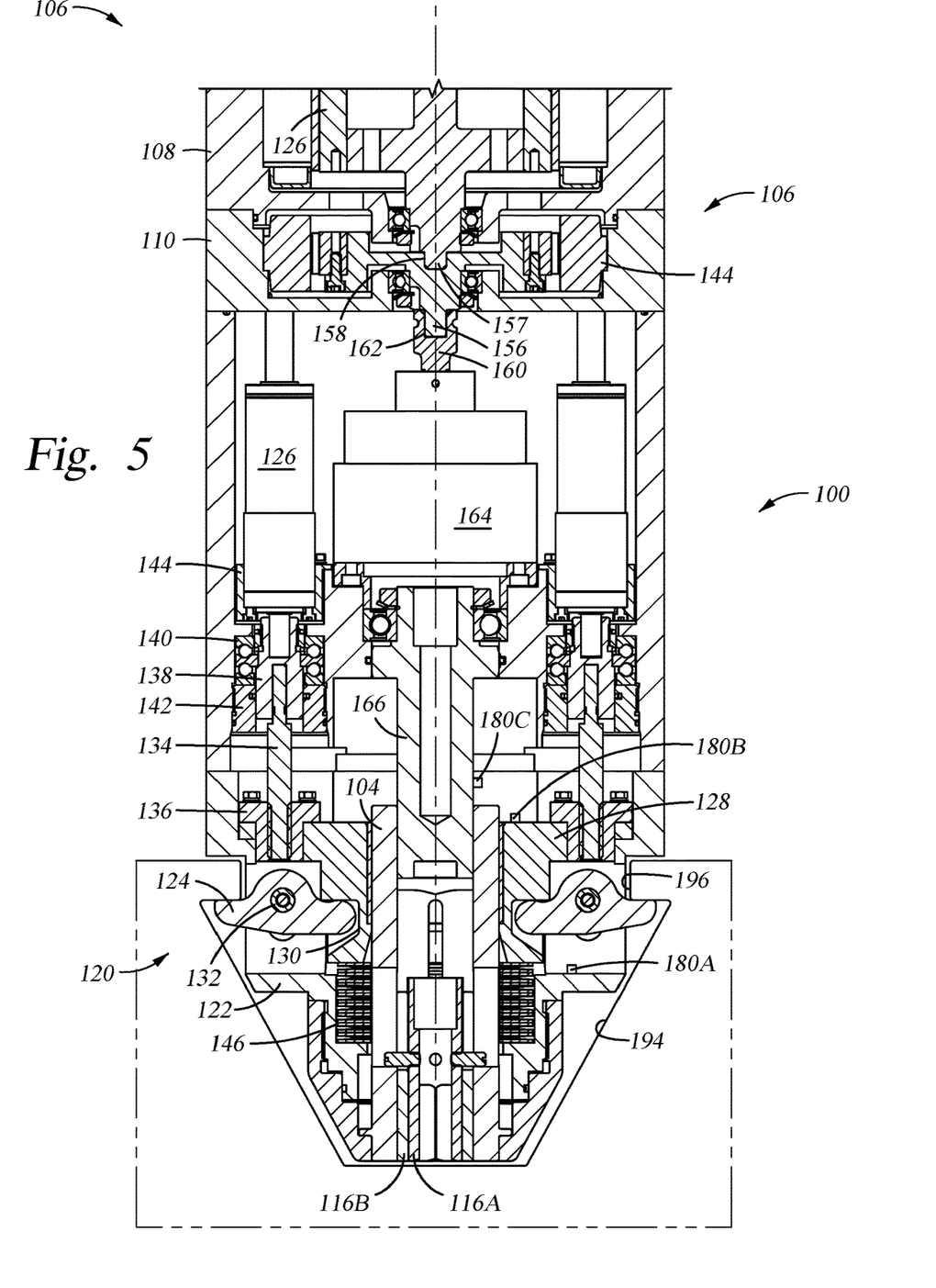
FIG. 5 is a cross-sectional view of the latch mechanism of the torque tool in accordance with one or more embodiments of the present disclosure.
Figure 6:
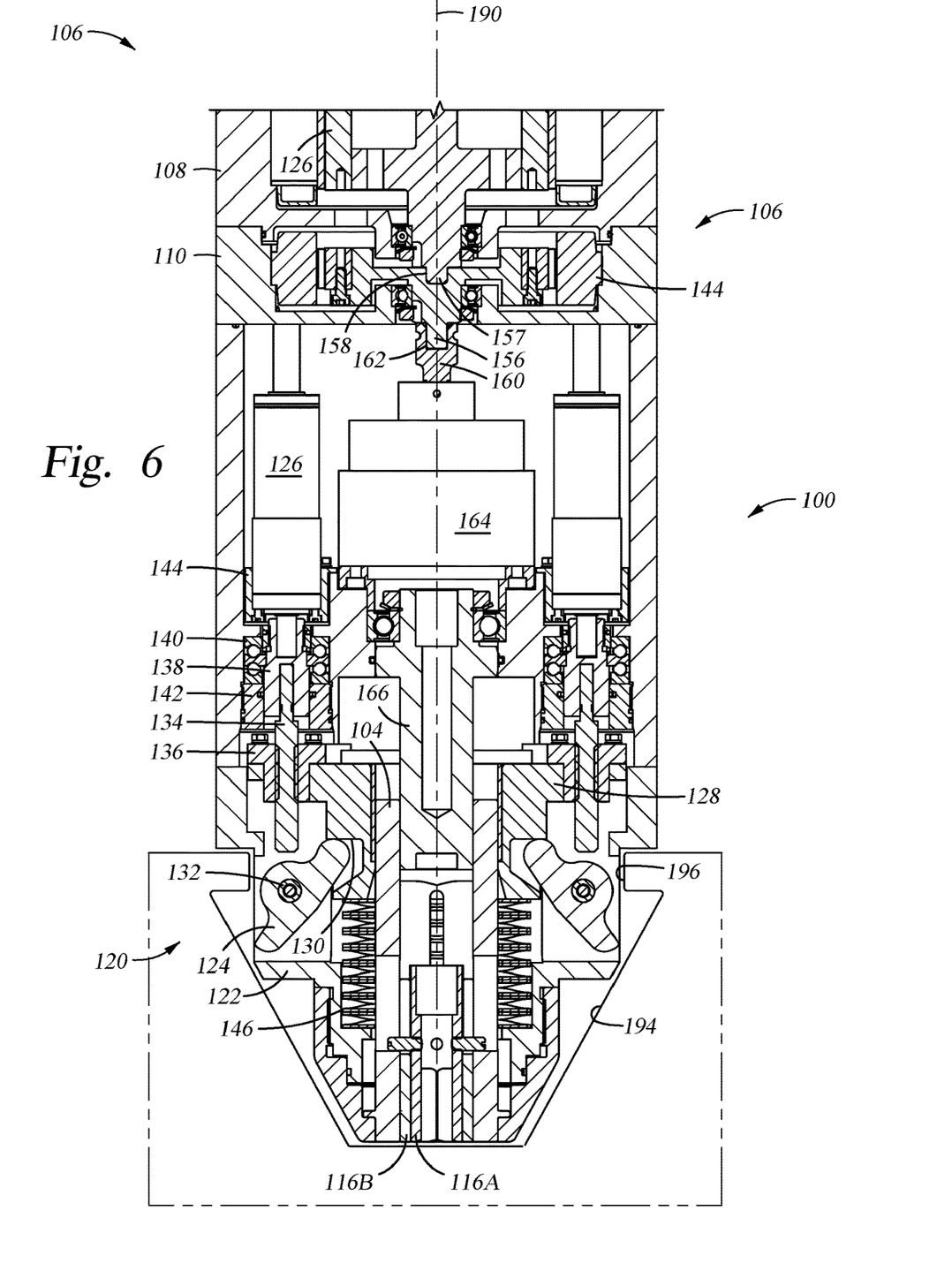
FIG. 6 is a cross-sectional view of the latch mechanism of the torque tool in accordance with one or more embodiments of the present disclosure.

FIGS. 4-6 provide multiple views of the latch mechanism 120 in accordance with one or more embodiments of the present disclosure. In particular, FIG. 4 is an exploded view of the latch mechanism 120, FIG. 5 is a cross-sectional view of the latch mechanism 120 with the latches 124 engaged with a shoulder 196 of a subsea component 194 to latch to the subsea component 194, and FIG. 6 is a cross-sectional view of the latch mechanism 120 with the latches 124 disengaged from the shoulder 196 of the subsea component 194 to unlatch from the subsea component 194. In one or more embodiments, one or more motors 126, such as an electric motor, are included within the latch mechanism 120 to move the latches 124. A motor 126 is shown as corresponding to each latch 124, though only a single motor 126 or more than two motors 126 may be used to move the one or more latches 124. The motors 126 are used to move the latches 124 from the disengaged position towards the engaged position. The motors 126 may also be used to move the latches 124 from the engaged position towards the disengaged position. If an electric motor, the motors 126 may include brushless DC electric motors.

In the above embodiments, multiple latches 124 and multiple motors 126 are shown included within the tool 100. As mentioned above though, the tool 100 may include one or more latches 124, and one or more motors 126. In an embodiment in which multiple latches 124 are included with the tool 100, the latches 124 may be positioned opposite each other with respect to an axis 190 of the tool 100, as shown. Similarly, the motors 126 may be positioned opposite each other with respect to the axis 190 of the tool 100, as shown.

The latches 124 are shown as rotating between an engaged position (FIG. 5) and a disengaged position (FIG. 6) with respect to the latch housing 122 and/or with respect to the subsea component 194. In particular, a collar 128 is positionable within and/or movable with respect to the latch housing 122, such as by having the collar 128 move along the axis 190. As the collar 128 moves with respect to the latch housing 122, the latches 124 rotate with respect to the latch housing 122. The latches 124 are shown as each received within a slot 130 of the collar 128 to engage and move the latches 124 as the collar 128 moves with respect to the latch housing 122. The latches 124 are shown as rotatably mounted to the latch housing 122 using pins 132. In one or more embodiments, though the present disclosure is not so limited, the latches 124 may be biased against the collar 128 to further facilitate engagement between the latches 124 and the collar 128, such as by using springs mounted around the pins 132.

To move the latches 124 with the motors 126 and the collar 128, a lead screw 134 and a nut 136 are coupled between each of the motors 126 and the collar 128 to convert or translate rotational motion from the motors 126 to linear motion for the collar 128. For example, the lead screw 134 is coupled with the motor 126 such that motor 126 is able to rotate the lead screw 134. More particularly, a drive coupling 138 is coupled between the lead screw 134 and the motor 126 to provide the rotation from the motor 126 to the lead screw 134 through the drive coupling 138. The lead screw 134 is received within and is threadedly coupled with the nut 136 such that the rotational motion of the lead screw 134 is converted or translated to linear motion of the nut 136 through the threaded engagement. The lead or pitch of the thread of the lead screw 134 may, for example, be up to six times the diameter of the lead screw 134 or more. Further, the nut 136 is coupled with the collar 128 such that as the nut 136 linearly moves (e.g., parallel to the axis 190), the collar 128 moves with the nut 136 (e.g., along the axis 190). In this way, as the motors 126 provide rotational motion, the motors 126 are able to linearly move the latches 124, through the collar 128, the lead screws 134, and the nuts 136.

A bearing assembly 140 and/or a seal assembly 142 may be included within the latch mechanism 120 to facilitate rotation and/or sealing within the latch mechanism 120. For example, as shown, the bearing assembly 140 may be positioned about the drive coupling 138 and between the drive coupling 138 and the latch housing 122. If no drive coupling 138 is present, the bearing assembly 140 may be positioned about the lead screw 134 and between the lead screw 134 and the latch housing 122. The bearing assembly 140 is used to facilitate rotation of the drive coupling 138 and/or lead screw 134 within and with respect to the latch housing 122. Further, as shown, a seal assembly 142 may be positioned about the drive coupling 138 and between the drive coupling 138 and the latch housing 122. If no drive coupling 138 is present, the seal assembly 142 may be positioned about the lead screw 134 and between the lead screw 134 and the latch housing 122. The seal assembly 142 is used to facilitate sealing about the drive coupling 138 and/or lead screw 134 within and with respect to the latch housing 122. Furthermore, in one or more embodiments, a motor carrier 144 may be used to facilitate mounting and prevent rotation of the motor 126 within the tool 100. The motor carrier 144 is positioned about the motor 126 with the motor carrier 144 positioned between the motor 126 and the housing 102.

As mentioned above, the latches 124 may be biased from the engaged position towards the disengaged position. As such, a biasing mechanism 146 is included with the tool 100 to bias the latches 124 from the engaged position towards the disengaged position. In this embodiment, the biasing mechanism 146 is positioned between the latch housing 122 and the collar 128 to bias and move the collar 128 with respect to the latch housing 122, and thus bias and move the latches 124 through the collar 128. The biasing mechanism 128 is shown as a spring, and more particularly a wave spring, positioned within the latch housing 122 and about the axis 190. However, other biasing mechanisms, such as a compressible material or gas, may be included within the torque tool 100 to bias the latches 124 from the engaged position towards the disengaged position without departing from the scope of the present disclosure.

The motors 126 of the latching mechanism 120 may be configured such that, when electric power is not provided to the motors 126, the motors 126 allow the latches 124 to move from the engaged position towards the disengaged position without applying an electrical load (e.g., a force or a counter-torque) against the movement of the latches 124. Thus, other than frictional loads or forces, the motors 126 will freely rotate or spin in the opposite direction to allow the latches 124 to move from the engaged position towards the disengaged position. In the event of a power loss, this may enable the biasing mechanism 146 to bias and push against the collar 128 such that the slot 130 of the collar 130 forces the latches 124 to move from the engaged position towards the disengaged position, thereby disengaging or unlatching the tool 100 from a subsea component. Because the nut 136 is fixed to the collar 128, then as the collar 128 and the nut 136 are moved by the biasing mechanism 146, the threaded engagement between the nut 136 and the lead screw 134 causes the lead screw 134 and, thus the motor 126, to rotate or spin in the opposite direction.

Additionally or alternatively, such as if the biasing mechanism 146 is not included, the tool 100 may be pulled, such as by the ROV 190 through the handle 112, to also move the latches 124 from the engaged position to the disengaged position to disengage the tool 100 from the subsea component. As the tool 100 is pulled away from the subsea component, the outer ends of the latches 124 are forced against the portion of the subsea component to which the latches 124 are latched, which causes the latches 124 to rotate about the pins 132 and force the collar 128 and the nut 136 to move back toward the disengaged position. Because the nut 136 is fixed to the collar 128, then as the collar 128 and the nut 136 are moved by the pull force applied to the latches 124, the threaded engagement between the nut 136 and the lead screw 134 causes the lead screw 134 and, thus the motor 126, to rotate or spin in the opposite direction.

If it is desired to keep the tool 100 engaged and latched with the subsea component, electric power may be provided to the motors 126 to lock the motors and prevent the motors 126 from freely spinning and allowing the latches 124 to move from the engaged position towards the disengaged position. Additionally or alternatively, one or more position sensors 180A-C may be coupled to one or more components of the latch mechanism 120, such as operably coupled to the latch 124, the collar 128, the lead screw 134, and/or the nut 136 to measure a position of the latch 124, the collar 128, the lead screw 134, or the nut 136. For example, as shown in FIG. 5, a position sensor 180A may be positioned adjacent the latch 124, such as secured to the latch housing 122, to measure a position of the latch 124. A position sensor 180B may also be coupled to the collar 128, and/or a position sensor 180C may be coupled to the drive shaft 166, each to measure the position of one or more components within the latch mechanism 120. The position sensors 180A-C may measure the position such that electric power is provided to the motors 126 of the latch mechanism 120 to maintain the position of the latches 124, as desired.

Referring still to FIGS. 4-6, one or more components are positioned or coupled between the drive mechanism 106 and the socket drive 104 to provide torque from the drive mechanism 106 to the socket drive 104. In particular, a drive extension 160, a gearbox 164, and a drive shaft 166 are coupled between the drive mechanism 106 to the socket drive 104 to translate or provide torque from the drive mechanism 106 to the socket drive 104. In this embodiment, the drive mechanism 106, and more particularly the second motor 110, is coupled to, such as directly engaged with, the drive extension 160. The second motor 110 is coupled to the drive extension 160 through a male and female coupling or engagement, such as with a key 156 of the second motor 110 that couples or engages with a groove 162 positioned or formed within the drive extension 160. Similarly, the first motor 108 is coupled to the second motor 110 through a male and female coupling or engagement, such as with a key 157 of the first motor 108 that couples or engages with a groove 158 positioned or formed within the second motor 110.

The drive extension 160 is coupled to the gearbox 164 to provide torque from the drive mechanism 106 through the drive extension 160 and to the gearbox 164. The gearbox 164 may be used to provide speed and torque conversions from the drive mechanism 106 to the socket drive 104. For example, in one embodiment, the gearbox 164 includes a step down gearbox with a fixed ratio. Further, the gearbox 164 is coupled to the drive shaft 166, which in turn is coupled to or engaged with the socket drive 104. The drive extension 160, the gearbox 164, the drive shaft 166, and/or additional components are, thus, used to provide torque from the drive mechanism 106 to the socket drive 104.

As discussed above, the electronics section 118 is able to receive electric power for the tool 100 and/or receive control signals for the tool 100. Thus, the electronics section 118 may be used to provide electric power to the motors 126 of the latch mechanism 120, as needed, and may be used to control the motors 126 of the latch mechanism 120, as needed. Further, if the motor 108 and/or the motor 110 of the drive mechanism 106 are electric, the electronics section 118 may be used to provide electric power to the motors 108 and 110 of the drive mechanism 106, as needed, and may be used to control the motors 108 and 110 of the drive mechanism 106, as needed.

A torque tool in accordance with the present disclosure may be able to provide better control, such as in a tool with all electric motors, and may be able to disengage or unlatch from a subsea component in the event of power loss. For example, the latch mechanism is mechanically durable and strong enough to prevent the torque tool from unintentionally unlatching from the subsea component, but also is able to unlatch and release from the subsea component during a power loss. The latch mechanism may hold the latches in place, such as in the latched positioned, by shorting out the motors of the latch mechanism. Additionally or alternatively, position sensors may measure positions of one or more components of the latch mechanism to maintain the position of the latches, as desired. If electric power is lost, the motors of the latch mechanism may freely rotate to allow the latches to move to the unlatched position, such as from the biasing mechanism biasing against the latches, and/or by pulling on the tool to move the latches to the unlatched position. Furthermore, a torque tool in accordance with the present disclosure may only have electric motors, or may be suitable for all electric operation, and thus is less likely to pollute the environment from leaking of hydraulic oil common with other torque tools.

While the foregoing is directed to embodiments of the disclosure, other and further embodiments of the disclosure thus may be devised without departing from the basic scope thereof, and the scope thereof is determined by the claims that follow.

The invention claimed is:

1. A torque tool configured to apply torque to a subsea component with a remotely operated vehicle (ROV), comprising:
   a housing;
   a socket drive rotatable within the housing;
   a latch movable between an engaged position to engage the subsea component and a disengaged position to disengage the subsea component; and
   a biasing mechanism at least partially positioned axially between the latch and an end of the housing and configured to move a collar to thereby move the latch from the engaged position to the disengaged position.

2. The tool of claim 1, further comprising an electric motor coupled to a lead screw to rotate the lead screw, wherein rotation of the lead screw linearly moves the collar to move the latch between the disengaged position and the engaged position.

3. The tool of claim 2, wherein the electric motor comprises a brushless DC electric motor.

4. The tool of claim 2, wherein, when power is not provided to the electric motor, the electric motor allows the latch to move from the engaged position to the disengaged position without applying an electrical load against movement of the latch.

5. The tool of claim 2, wherein the latch is rotatable between the engaged position and the disengaged position.

6. The tool of claim 5, wherein linear movement of the collar with respect to the housing rotates the latch with respect to the housing.

7. The tool of claim 6, wherein the biasing mechanism is positioned at least partially between the housing and the collar.

8. The tool of claim 7, wherein the biasing mechanism comprises a spring positioned within the housing.

9. The tool of claim 6, wherein:
   the lead screw is threadedly coupled with a nut; and
   the nut is coupled to the collar.

10. The tool of claim 9, further comprising:
    a drive coupling coupled between the electric motor and the lead screw;
    a bearing assembly positioned about the drive coupling and between the drive coupling and the housing;
    a seal assembly positioned about the drive coupling and between the drive coupling and the housing; and a motor carrier positioned about the electric motor and between the electric motor and the housing.

11. The tool of claim 1, wherein:
the tool further comprises a second latch;
the latch is positioned opposite the second latch with respect to an axis of the tool; and
the biasing mechanism is configured to bias the latch and the second latch from the engaged position to the disengaged position.

12. The tool of claim 1, further comprising a drive mechanism comprising an electric motor configured to rotate the socket drive within the housing.

13. A torque tool configured to apply torque to a subsea component with a remotely operated vehicle (ROV), comprising:
a housing;
a socket drive rotatable within the housing; and
a latch movable between an engaged position to engage the subsea component and a disengaged position to disengage the subsea component;
an electric motor to coupled to a lead screw to rotate the lead screw, wherein rotation of the lead screw linearly moves a collar that moves the latch between the disengaged position and the engaged position; and
a biasing mechanism at least partially positioned axially between the latch and an end of the housing and configured to move the collar to thereby move the latch from the engaged position to the disengaged position.

14. The tool of claim 13, wherein, when power is not provided to the electric motor, the electric motor allows the latch to move from the engaged position to the disengaged position without applying an electrical load against movement of the latch.

15. The tool of claim 13, further comprising an electronics section configured to receive electric power and provide the electric power to the electric motor.

16. The tool of claim 15, further comprising a drive mechanism comprising an electric motor configured to rotate the socket drive within the housing, wherein the electric power is provided from the electronics section to the electric motor through the drive mechanism.

17. The tool of claim 13, further comprising an electronics section configured to receive control signals to control the electric motor.

18. A method of applying torque to a subsea component, comprising:
receiving electric power at a torque tool;
receiving a control signal at the torque tool;
latching a latch of the torque tool to the subsea component using the electric power based upon the control signal, the latching comprising rotating a lead screw to linearly move a collar that moves the latch; and
providing torque to the subsea component from the torque tool by rotating a socket drive positioned within a housing of the torque tool; and
unlatching the latch of the torque tool from the subsea component by biasing the collar using a biasing mechanism to move the collar and thereby move the latch, wherein the biasing mechanism is at least partially positioned axially between the latch and an end of the housing.

19. The method of claim 18, wherein:
the biasing the collar moves the collar and thereby moves the latch from an engaged position to a disengaged position to disengage and unlatch the torque tool from the subsea component.

20. The method of claim 18, wherein the receiving the electric power comprises receiving the electric power from an ROV or a surface support structure.

* * * * *